(12) United States Patent
Bartley et al.

(10) Patent No.: US 9,873,847 B2
(45) Date of Patent: Jan. 23, 2018

(54) ION TOLERANT CORROSION INHIBITORS AND INHIBITOR COMBINATIONS FOR FUELS

(71) Applicant: The Lubrizol Corporation, Wickliffe, OH (US)

(72) Inventors: Stuart L. Bartley, Wickliffe, OH (US); Mitchell M. Jackson, Chargrin Falls, OH (US); Zen-Yu Chang, Conroe, TX (US); David C. Arters, Solon, OH (US); Anthony R. Frank, Painesville, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 14/770,173

(22) PCT Filed: Feb. 28, 2014

(86) PCT No.: PCT/US2014/019375
§ 371 (c)(1),
(2) Date: Aug. 25, 2015

(87) PCT Pub. No.: WO2014/137800
PCT Pub. Date: Sep. 12, 2014

(65) Prior Publication Data
US 2016/0032208 A1 Feb. 4, 2016

Related U.S. Application Data

(60) Provisional application No. 61/773,949, filed on Mar. 7, 2013.

(51) Int. Cl.
| | | |
|---|---|---|
| *C10L 10/04* | (2006.01) | |
| *C10G 75/02* | (2006.01) | |
| *C10L 1/18* | (2006.01) | |
| *C10L 1/19* | (2006.01) | |
| *C10G 9/16* | (2006.01) | |
| *C09K 15/06* | (2006.01) | |
| *C10L 1/182* | (2006.01) | |
| *F02M 65/00* | (2006.01) | |
| *C10L 1/198* | (2006.01) | |
| *C10L 1/188* | (2006.01) | |

(52) U.S. Cl.
CPC .............. *C10L 10/04* (2013.01); *C09K 15/06* (2013.01); *C10G 9/16* (2013.01); *C10G 75/02* (2013.01); *C10L 1/18* (2013.01); *C10L 1/1802* (2013.01); *C10L 1/1826* (2013.01); *C10L 1/19* (2013.01); *F02M 65/007* (2013.01); *C10L 1/1883* (2013.01); *C10L 1/198* (2013.01); *C10L 2200/0446* (2013.01); *C10L 2270/026* (2013.01)

(58) Field of Classification Search
CPC .... C10L 10/04; C10L 1/18; C10L 1/19; C10L 1/198; C10L 2200/0446; C10L 1/1883; C10L 2270/026; C10L 1/1802; C10L 1/1826; C10G 75/02; C10G 9/16; C09K 15/06; F02M 65/007
See application file for complete search history.

(56) References Cited

U.S. PATENT DOCUMENTS

| | | | |
|---|---|---|---|
| 2,334,158 A | 11/1943 | Von Fuchs et al. | |
| 2,962,443 A | 11/1960 | Rhodes | |
| 2,993,772 A * | 7/1961 | Stromberg | C07C 57/13 44/351 |
| 3,447,918 A | 6/1969 | Amick | |
| 3,658,707 A * | 4/1972 | Delafield | C10L 1/143 252/392 |
| 4,440,545 A | 4/1984 | Weidig | |
| 4,863,624 A * | 9/1989 | Emert | C10M 129/95 44/317 |
| 5,137,980 A | 8/1992 | Degonia et al. | |
| 8,475,541 B2 * | 7/2013 | Fang | C08F 8/32 44/331 |
| 2011/0219674 A1* | 9/2011 | Barbour | C10L 1/143 44/347 |

FOREIGN PATENT DOCUMENTS

WO 2004/024850 A1 3/2004

* cited by examiner

*Primary Examiner* — Cephia D Toomer
(74) *Attorney, Agent, or Firm* — Iken S. Sans; Teresan W. Gilbert

(57) ABSTRACT

This invention relates to compositions and methods for inhibiting corrosion and deposit formation in fuel handling equipment, with reduced or eliminated incidence of fuel filter plugging and internal diesel injector deposits (IDID) in the equipment that eventually employs the final commercially blended form of the fuel. More specifically, the invention relates to inhibiting corrosion from the walls of fuel pipelines and storage equipment and preventing deposits in engines.

16 Claims, No Drawings

ION TOLERANT CORROSION INHIBITORS AND INHIBITOR COMBINATIONS FOR FUELS

CROSS REFERENCE TO RELATED APPLICATION

This application claims priority from PCT Application Serial No. PCT/US2014/019375 filed on Feb. 28, 2014, which claims the benefit of U.S. Provisional Application No. 61/773,949 filed on Mar. 7, 2013, both incorporated herein by reference.

BACKGROUND OF THE INVENTION

This invention relates to compositions and methods for inhibiting corrosion and deposit formation in fuel handling equipment, with reduced or eliminated incidence of fuel filter plugging and internal diesel injector deposits (IDID) in the equipment that eventually employs the final commercially blended form of the fuel. More specifically, the invention relates to inhibiting corrosion from the walls of fuel pipelines and storage equipment and preventing deposits in engines.

Commercial fuels are blends of refinery fuels with certain other additives. In particular, corrosion inhibitors must be added at refineries to ensure the refinery fuel does not corrode the refinery equipment. Thus, while other additives are introduced into the refinery fuel at the refinery or at a fuel terminal to create the commercial fuels, commercial fuel generally includes a mixture of at least the refinery fuel and whatever corrosion inhibitor that was employed at the refinery.

Recently, there has been reported increases in the incidence and severity of, for example, fuel filter plugging and internal diesel injector deposits (IDID) in variously fueled engines using commercial fuels. Among the postulated causes of the plugging and IDID are soaps that form in the refinery fuel from the reaction of acidic corrosion inhibitors with ion containing contaminants in the refinery fuel, such as sodium and calcium containing contaminants. For example, presently dodecenyl succinic acid (DDSA) is added to diesel fuel at the refinery to inhibit corrosion for the period of time the diesel fuel is in storage at the refinery through transport of the fuel in the refinery pipeline to the fuel terminal at which the diesel fuel is blended with other performance additives into a commercial fuel. It is increasingly being discovered that DDSA reacts with sodium contaminants in the refinery fuel, and this contamination leads to soap contamination in the later commercial fuel, ultimately resulting in fuel filter plugging and IDID.

As evidence mounts of this effect, further complications are coming about due to changes in fuel composition, fuel injection hardware, and levels and types of fuel additives in use in the final blended forms of the refinery fuel.

A new and improved additive composition has now been found to inhibit corrosion in refinery fuel, which leads to reduced or eliminated incidence of fuel filter plugging and IDID in engines run on the final blended form of the refinery fuel.

SUMMARY OF THE INVENTION

The present invention provides fuel additive compositions and methods of inhibiting corrosion in refinery fuel handling equipment that leads to improved IDID and fuel filter performance in engines run on a commercialized mixture of the refinery fuel.

The fuel additive compositions of the invention can include a mixture of (a) a substituted hydrocarbon additive and (b) another substituted hydrocarbon additive, different from the substituted hydrocarbon additive of (a). The substituted hydrocarbon additive of (a) includes a short chain hydrocarbon substituted with at least two carboxy functionalities in the form of acids or at least one carboxy functionality in the form of an anhydride. In one embodiment, the substituted hydrocarbon additive of (a) can be a condensation product with an alcohol or an epoxide. The substituted hydrocarbon additive of (b) includes a substituted hydrocarbon additive comprising a long chain hydrocarbon substituted with at least two carboxy functionalities in the form of acids or at least one carboxy functionality in the form of an anhydride.

In one embodiment, either the substituted short chain hydrocarbon of (a), the substituted long chain hydrocarbon of (b), or a combination thereof, can comprise a hydrocarbyl substituted acylating agent having di-acid functionality. For example, the substituted hydrocarbon of either of (a), (b), or a combination thereof, can comprise a succinic acylating agent.

In another embodiment, the substituted hydrocarbon of either of (a), (b), or a combination thereof, can comprise, or in some embodiments, may be selected from the group consisting of: (i) hydrocarbyl substituted succinic anhydrides; (ii) hydrolyzed hydrocarbyl substituted succinic anhydrides; and (iii) combinations thereof.

In some embodiments, the fuel additive compositions can further include (c) a hydrocarbon solvent that is liquid at 20° C. In the same, or different embodiments, the fuel additive compositions can additionally include (d) a fuel additive component. The fuel additive component can contain at least one additive, such as one or more dispersants, where the additives of the fuel additive component (d), when present, are different from the substituted hydrocarbon additives of (a) and (b).

The methods of the invention include a method of preventing corrosion in refinery equipment. In a particular embodiment, there is provided a method of preventing corrosion in refinery equipment comprising adding a fuel additive composition according to the invention as disclosed herein, to a refinery fuel to create a refinery fuel mixture of the refinery fuel and fuel additive composition in the refinery equipment, and operating the refinery equipment.

In another embodiment, the method of preventing corrosion in refinery equipment can further comprise reducing in an engine at least one of (1) injector deposits, and (2) fuel filter plugging. The method can include adding a fuel additive composition according to the invention as disclosed herein, to a refinery fuel to create a refinery fuel mixture of the refinery fuel and fuel additive composition in the refinery equipment as discussed above. Optionally, the method can include combining other fuel additives to the refinery fuel mixture to create a commercial fuel composition containing the refinery fuel mixture. Finally, the method can include applying the commercial fuel composition to an engine, and operating the engine.

The invention further provides the use of the described fuel additive compositions to reduce corrosion in refinery equipment and to reduce at least one of injector deposit formation or fuel filter plugging in an engine operated with a commercial fuel composition including a refinery fuel mixture of a refinery fuel and the fuel additive composition.

In some embodiments the refinery equipment includes flowlines, pipelines, injection lines, wellbore surfaces, storage tanks, process equipment, vessels and/or water injection systems.

DETAILED DESCRIPTION OF THE INVENTION

Various preferred features and embodiments will be described below by way of non-limiting illustration.

FIELD OF THE INVENTION

The present invention involves fuel additive compositions, methods of employing the fuel additive compositions in fuel compositions, preferably in refinery fuel compositions, and uses of fuel additive compositions. More particularly, the fuel additive compositions of the invention can be employed in methods of inhibiting corrosion, preventing deposits in internal diesel injectors, and preventing fuel filter plugging, for example by binding ion containing contaminants, both during storage and transportation of refinery fuels as well as in the use of fuel compositions containing the refinery fuels in internal combustion engines.

As used herein, "refinery fuels" refers to fuels still at the refinery or within the refinery pipeline. In many embodiments, refinery fuel includes fuel that has not yet met refinery shipment specifications, for example, having a NACE Corrosion Specification at the refinery of B+ or better as measured according to ASTM TM0172. Passage of such refinery shipment specifications are often required before refinery fuel can be transported to fuel terminals. In contrast, "commercial fuels" refers to a fuel containing refinery fuel, and that has been blended with further commercial additives, either at a refinery, fuel terminal or with an aftermarket consumer fuel additive package.

The fuel additive compositions of the present invention may be used in various fuels to reduce the tendency of the fuel to corrode metal surfaces. In a particular embodiment, the fuel additive compositions of the present invention may be used in refinery fuel to reduce the tendency of the refinery fuel to corrode metal surfaces in the refinery and throughout the fuel pipeline. Likewise, the fuel additive compositions may be used in blending station fuels and in commercial fuels. In addition to preventing corrosion, the fuel additive compositions can prevent deposit formation in internal diesel injectors, for example, by binding ion containing contaminants, such as sodium or calcium, that can otherwise have negative interactions with other corrosion inhibitors. The fuel additive compositions of the present invention may also provide comparable and/or improved detergency, both within the refinery fuel and in the final commercial fuel, leading to improved engine deposit control when the refinery fuels are ultimately used in a final commercial fuel to operate an internal combustion engine. These characteristics allow for improved engine performance, including but not limited to reductions in fuel filter plugging, injector fouling, in particular IDID, reduced deposit-causing engine power losses, reduced deposit-caused fuel economy losses and reduced deposit-caused engine emissions.

The fuel additive compositions of the present invention include substituted hydrocarbon additive compounds. In particular, the compositions employ a substituted short chain hydrocarbon additive compound and a substituted long chain hydrocarbon additive compound. The substituted short chain hydrocarbon additive compound in particular can be included in the form of a condensation product with an alcohol or an epoxide.

In one embodiment, there is provided a fuel additive composition comprising (a) substituted hydrocarbon additive comprising a short chain hydrocarbon substituted with at least two carboxy functionalities in the form of acids or at least one carboxy functionality in the form of an anhydride, and (b) a substituted hydrocarbon additive comprising a long chain hydrocarbon substituted with at least two carboxy functionalities in the form of acids or at least one carboxy functionality in the form of an anhydride. In an embodiment, the substituted hydrocarbon additive of (a) can be a condensation product with an alcohol or an epoxide.

In an embodiment, the short chain hydrocarbon of (a) is substituted with at least two carboxy functionalities in the form of acids or at least one carboxy functionality in the form of an anhydride, and the long chain hydrocarbon of (b) is substituted with at least two carboxy functionalities in the form of acids. In another embodiment, the short chain hydrocarbon is substituted with at least two carboxy functionalities in the form of acids or at least one carboxy functionality in the form of an anhydride, and the long chain hydrocarbon is substituted with at least one carboxy functionality in the form of an anhydride. In a further embodiment, the short chain hydrocarbon is substituted with at least two carboxy functionalities in the form of acids and the long chain hydrocarbon is substituted with at least two carboxy functionalities in the form of acids or at least one carboxy functionality in the form of an anhydride. In a still further embodiment, the short chain hydrocarbon is substituted with at least one carboxy functionality in the form of an anhydride, and the long chain hydrocarbon is substituted with at least two carboxy functionalities in the form of acids or at least one carboxy functionality in the form of an anhydride.

The substituted hydrocarbon additives of the present invention can comprise either a short chain hydrocarbon or a long chain hydrocarbon, either of which may be substituted with at least two carboxy functionalities in the form of acids or at least one carboxy functionality in the form an anhydride. In some embodiments the substituted hydrocarbon additives, independently, can be hydrocarbons substituted with at least two carboxy functionalities in the form of acids or anhydrides. In other embodiments the additives are a hydrocarbyl-substituted succinic acylating agent. In further embodiments the substituted hydrocarbon additives can be dimer acid compounds, trimer acid compounds, or a mixture thereof. In still further embodiments the substituted hydrocarbon additives of the present invention can include a combination of two or more of the substituted hydrocarbon additives described in this section.

The substituted hydrocarbon additives include dimer and trimer acids. Dimer and trimer acids are a type of di-acid or tri-acid polymer derived from fatty acids and/or polyolefins, including the polyalkenes described herein, which contain acid functionality. With respect to embodiments of the short chain hydrocarbon additive of (a) (more succinctly referred to as the "short chain hydrocarbon"), the dimer or trimer acid is a short chain dimer or trimer acid derived from $C_6$ to $C_{24}$ polyolefins and/or fatty acids, $C_8$ to $C_{20}$ polyolefins and/or fatty acids, and/or $C_{10}$ to $C_{16}$ polyolefins and/or fatty acids. With respect to embodiments of the long chain hydrocarbon of (b), more succinctly referred to as the "long chain hydrocarbon," the dimer or trimer acid is a long chain dimer or trimer acid derived from $C_{25}$ to $C_{350}$ polyolefins and/or fatty acids, $C_{30}$ to $C_{300}$ polyolefins and/or fatty acids, and/or $C_{40}$ to $C_{200}$ polyolefins and/or fatty acids.

The substituted hydrocarbon additives include succinic acids, halides, anhydrides and combination thereof. In some embodiments the agents are acids or anhydrides, and in other embodiments the agents are anhydrides, and in still other embodiments the agents are hydrolyzed anhydrides. With respect to the short chain hydrocarbon, the hydrocarbon of the substituted hydrocarbon additive and/or the primary hydrocarbyl group of the hydrocarbyl-substituted succinic acylating agent generally contains an average of at least about 6, or 8, or about 10, up to about 24, or to about 20, or to about 16 carbon atoms. The short chain hydrocarbon can be, for example, an alkane or alkene, and can be linear, branched, or cyclic, as well as aliphatic or aromatic. With respect to the long chain hydrocarbon, the hydrocarbon of the substituted hydrocarbon additive and/or the primary hydrocarbyl group of the hydrocarbyl-substituted succinic acylating agent generally contains an average of at least about 10, or about 30, or about 35 up to about 350, or to about 300, or to about 200 carbon atoms. In a further embodiment, the long chain hydrocarbon of the substituted hydrocarbon additive and/or the primary hydrocarbyl group of the hydrocarbyl-substituted succinic acylating agent can contain an average of at least about 25 to about 250, or about 40 to about 180, or in a further embodiment about 60 to about 110 carbon atoms. The long chain hydrocarbon can be, for example, an alkane or alkene, and can be linear, branched, or cyclic, as well as aliphatic or aromatic.

In one embodiment, the hydrocarbyl group can be derived from a polyalkene. In terms of the short chain hydrocarbon, the polyalkene may be characterized by a Mn (number average molecular weight) of at least about 80, or 140. Generally, the short chain polyalkene can be characterized by an Mn of about 170, or about 200, or about 220, or even about 250, up to about 420, or to about 350, or to about 320, or even to about 300. In terms of the long chain hydrocarbon, the polyalkene may be characterized by an Mn of at least about 280, or 300. Generally, the long chain polyalkene is characterized by an Mn of about 400, or about 500, or about 700, or about 800, or even about 900 up to about 5000, or to about 2500, or to about 2000, or even to about 1500, and, in another embodiment, the Mn varies between about 300, or about 500, or about 700 up to about 1200 or to about 1300.

The polyalkenes include homopolymers and interpolymers of polymerizable olefin monomers of 2 to about 16 or to about 6, or to about 4 carbon atoms. The olefins may be monoolefins such as ethylene, propylene, 1-butene, isobutene, and 1-octene; or a polyolefinic monomer, such as diolefinic monomer, such 1,3-butadiene and isoprene. In one embodiment, the interpolymer is a homopolymer. An example of a polymer is a polybutene. In one instance about 50% of the polybutene is derived from isobutylene. The polyalkenes are prepared by conventional procedures.

In one embodiment, the hydrocarbyl groups are derived from polyalkenes having an Mw/Mn from about 1.5 or about 1.8, or about 2, or about 2.5 to about 3.6, or about 3.2. In some embodiments of the long chain hydrocarbon additive, the polyalkene is polyisobutylene with a molecular weight of 800 to 1200. The preparation and use of substituted hydrocarbons and/or substituted succinic acylating agents, wherein the hydrocarbon and/or substituent is derived from such polyalkenes are described in U.S. Pat. No. 4,234,435, the disclosure of which is hereby incorporated by reference.

In another embodiment, the substituted hydrocarbon and/or succinic acylating agents are prepared by reacting the above described polyalkenes with an excess of maleic anhydride to provide substituted succinic acylating agents wherein the number of succinic groups for each equivalent weight of substituent group is at least 1, or 1.2, or 1.3, or to about 1.5, or to about 1.7, or to about 1.8. The maximum number generally will not exceed 4.5, or to about 2.5, or to about 2.1, or to about 2.0. The polyalkenes here may be any of those described above.

In another embodiment, the short chain hydrocarbon and/or hydrocarbyl group contains an average of from about 8, or about 10, or about 12 up to about 40, or to about 30, or to about 24, or to about 20 carbon atoms. In one embodiment, the short chain hydrocarbyl group contains an average from about 16 to about 18 carbon atoms. In another embodiment, the short chain hydrocarbyl group is a tetrapropenyl group, or a dodecyl hydrocarbyl group.

In another embodiment the long chain hydrocarbon and/or hydrocarbyl group contains an average of from about 10, or about 30, or about 35 up to about 360, or to about 200, or to about 100 carbon atoms. In a further embodiment, the long chain hydrocarbon and/or hydrocarbyl group contains an average of from about 20 to about 360, or about 40 to about 180, or in a further embodiment about 60 to about 110 carbon atoms.

In one embodiment, the hydrocarbyl group is an alkenyl group.

Either of the short chain or long chain hydrocarbons and/or hydrocarbyl groups may be derived from one or more olefins having from about 2 to about 40 carbon atoms or oligomers thereof. These olefins are preferably alpha-olefins (sometimes referred to as mono-1-olefins) or isomerized alpha-olefins. Examples of the alpha-olefins include ethylene, propylene, butylene, 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetra-cosene, etc. Commercially available alpha-olefin fractions that may be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. In one embodiment, the olefins are $C_{16}$ and $C_{16-18}$ alpha-olefins. In one embodiment, the olefin monomers include ethylene, propylene and 1-butene.

Isomerized alpha-olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. Briefly these procedures involve contacting alpha-olefin with a cation exchange resin at a temperature in a range of about 80° to about 130° C. until the desired degree of isomerization is achieved. These procedures are described for example in U.S. Pat. No. 4,108,889 which is incorporated herein by reference.

The mono-olefins may be derived from the cracking of paraffin wax. The wax cracking process yields both even and odd number $C_{6-20}$ liquid olefins of which 85% to 90% are straight chain 1-olefins. The balance of the cracked wax olefins is made up of internal olefins, branched olefins, diolefins, aromatics and impurities. Distillation of the $C_{6-20}$ liquid olefins, obtained from the wax cracking process, yields fractions (e.g., $C_{15-18}$ alpha-olefins) which are useful in preparing the succinic acylating agents.

Other mono-olefins can be derived from the ethylene chain growth process. This process yields even numbered straight-chain 1-olefins from a controlled Ziegler polymerization. Other methods for preparing the mono-olefins include chlorination-dehydrochlorination of paraffin and catalytic dehydrogenation of paraffins.

The above procedures for the preparation of mono-olefins are well known to those of ordinary skill in the art and are described in detail under the heading "Olefins" in the *Encyclopedia of Chemical Technology*, Second Edition, Kirk and Othmer, Supplement, Pages 632,657, Interscience Publishers, Div. of John Wiley and Son, 1971, which is hereby incorporated by reference for its relevant disclosures pertaining to methods for preparing mono-olefins.

Succinic acylating agents are prepared by reacting the above-described olefins, isomerized olefins or oligomers thereof with unsaturated carboxylic acylating agents, such as itaconic, citraconic, or maleic acylating agents at a temperature of about 160°, or about 185° C. up to about 240° C., or to about 210° C. Maleic acylating agents are the preferred unsaturated acylating agent. The procedures for preparing the acylating agents are well known to those skilled in the art and have been described for example in U.S. Pat. No. 3,412,111; and Ben et al, "The Ene Reaction of Maleic Anhydride With Alkenes", J.C.S. Perkin II (1977), pages 535-537. These references are incorporated by reference for their disclosure of procedures for making the above acylating agents. In one embodiment, the alkenyl group is derived from oligomers of lower olefins, i.e., olefins containing from 2 to about 6, or about 4 carbon atoms. Examples of these olefins include ethylene, propylene and butylene.

The olefin, olefin oligomer, or polyalkene may be reacted with the carboxylic reagent such that there is at least one mole of carboxylic reagent for each mole of olefin, olefin oligomer, or polyalkene that reacts. Preferably, an excess of carboxylic reagent is used. In one embodiment, this excess is between about 5% to about 25%. In another embodiment, the excess is greater than 40%, or greater than 50%, and even greater than 70%.

The conditions, i.e., temperature, agitation, solvents, and the like, for forming either of the short chain or long chain hydrocarbyl-substituted succinic acylating agents, are known to those in the art. Examples of patents describing various procedures for preparing useful acylating agents include U.S. Pat. No. 3,172,892 (Le Suer et al.); U.S. Pat. No. 3,215,707 (Rense); U.S. Pat. No. 3,219,666 (Norman et al); U.S. Pat. No. 3,231,587 (Rense); U.S. Pat. No. 3,912,764 (Palmer); U.S. Pat. No. 4,110,349 (Cohen); and U.S. Pat. No. 4,234,435 (Meinhardt et al); and U.K. 1,440,219. The disclosures of these patents are hereby incorporated by reference.

In one embodiment the short chain hydrocarbon additive can contain di-acid functionality. In other embodiments, the short chain hydrocarbon additive comprises a short chain hydrocarbon substituted with at least two carboxy functionalities in the form of acids.

In one embodiment the short chain hydrocarbon can be a $C_{12}$ olefin and the di-acid functionality of the agent is derived from carboxylic acid groups, such as hydrocarbyl substituted succinic acid.

In one embodiment the short chain hydrocarbon can be polyisobutylene and the di-acid functionality of the agent is derived from carboxylic acid groups, such as hydrocarbyl substituted succinic acid.

In another embodiment of the substituted short chain hydrocarbon, the substituted short chain hydrocarbon additive can contain at least one carboxy functionality in the form of an anhydride.

In one embodiment, the substituted short chain hydrocarbon comprises a short chain hydrocarbon substituted with at least two carboxy functionalities in the form of acids or at least one carboxy functionality in the form of an anhydride In some embodiments the short chain hydrocarbyl substituted acylating agent comprises one or more hydrocarbyl substituted succinic anhydride groups. In some embodiments the short chain hydrocarbyl substituted acylating agent comprises one or more hydrolyzed short chain hydrocarbyl substituted succinic anhydride groups.

In some embodiments the short chain hydrocarbyl substituents of the acylating agents described above are derived from homopolymers and/or copolymers containing 2 to 12 carbon atoms. In some embodiments the short chain hydrocarbyl substituents of any of the acylating agents described above are derived from polyisobutylene.

In one embodiment, the long chain hydrocarbon can contain di-acid functionality. In other embodiments, the long chain hydrocarbon can comprise a long chain hydrocarbon substituted with at least two carboxy functionalities in the form of acids.

In another embodiment of the substituted long chain hydrocarbon, the substituted long chain hydrocarbon additive can contain at least one carboxy functionality in the form an anhydride.

In one embodiment, the substituted long chain hydrocarbon comprises a long chain hydrocarbon substituted with at least two carboxy functionalities in the form of acids or at least one carboxy functionality in the form of an anhydride.

In one embodiment the long chain hydrocarbon can be polyisobutylene and the di-acid functionality of the agent is derived from carboxylic acid groups, such as hydrocarbyl substituted succinic acid.

In some embodiments the long chain hydrocarbyl substituted acylating agent comprises one or more long chain hydrocarbyl substituted succinic anhydride groups. In some embodiments the long chain hydrocarbyl substituted acylating agent comprises one or more hydrolyzed long chain hydrocarbyl substituted succinic anhydride groups.

In some embodiments the long chain hydrocarbyl substituents of the acylating agents described above are derived from homopolymers and/or copolymers containing 2 to 12 carbon atoms. In some embodiments the long chain hydrocarbyl substituents of any of the acylating agents described above are derived from polyisobutylene.

The short chain hydrocarbon substituted with at least two carboxy functionalities in the form of acids or at least one carboxy functionality in the form of an anhydride can be condensed with an alcohol or an epoxide.

The alcohols with which the condensation may in principle be performed preferably contain up to 40 carbon atoms, preferably 1 to 24, more preferably 1 to 18 or 2 to 12 or 8 carbon atoms. The alcohols can be aliphatic, cycloaliphatic, aromatic, or heterocyclic, including aliphatic-substituted cycloaliphatic aclohols, aliphatic-substituted aromatic alcohols, aliphatic-substituted heterocyclic aclohols, cycloaliphatic-substituted aliphatic alcohols, cycloaliphati-substituted aromatic alcohols, cycloaliphatic-substituted heterocyclic aclohols, heterocyclic-substituted aliphatic alcohols, heterocylici-substituted cycloaliphatic alcohols, and heterocyclic-substituted aromatic alcohols. The alcohols may contain non-hydrocarbon substituents of a type which do not interfere with the reaction of the alcohols with the acid (or corresponding acylating agent). The alcohols can be monohydric alcohols (mono-alcohol) such as methanol, ethanol, isooctanol, dodecanol, and cyclohexanol. In an alternative embodiment, the alcohols can be polyhydric alcohols (diol or polyol), such as alkylene polyols. Preferably, such polyhydric alcohols contain from 2 to 40 carbon atoms, more preferably 2 to 20; and from 2 to 10 hydroxyl groups, more preferably 2 to 6. Polyhydric alcohols include ethylene glycols, including di-, tri- and tetraethylene glycols; propylene glycols, including di-, tri- and tetrapropylene glycols; glycerol; propane diol; butane diol; hexane diol; sorbitol; arabitol; mannitol; sucrose; fructose; glucose; cyclohexane diol; erythritol; and pentaerythritols, including di- and tripentaerythritol; preferably, diethylene glycol, triethylene glycol, glycerol, sorbitol, pentaerythritol and dipentaerythritol.

The alcohol can also be an alkanolamine, that is, an alcohol with amine functionality. Generally, the alkanolamines that are useful in the present invention are those described which are reacted with the hydrocarbyl-substituted carboxylic acylating agent, include primary, secondary or tertiary alkanol amines or mixtures thereof. The alkanolamine may be cyclic or acyclic. Examples of alkanolamines include mono-, di-, and tri-ethanolamine, diethylethanolamine, dimethylethanolamine, ethylethanolamine, butyldiethanolamine, aminobutanol, aminomethylpropanol, aminopropanol, aminomethylpropanediol, aminoethylpropanediol, aminoethylheptanol and aminopentanol.

The alkanolamines may also be an ether N-(hydroxyhydrocarbyl) amine. These are hydroxypoly(hydrocarbyloxy) analogs of the above-described alkanolamines (these analogs also include hydroxyl-substituted oxyalkylene analogs). Such N-(hydroxyhydrocarbyl) amines can be conveniently prepared by reaction of epoxides with aforedescribed amines.

In another embodiment, the alkanolamine may be hydroxy-containing polyamines. Hydroxy-containing polyamine analogs of hydroxy monoamines, particularly hydroxyhydrocarbylated alkylenepolyamines (e.g., N,N(diethanol)ethylene diamine) may also be used. Such polyamines can be made by reacting alkylene polyamines with one or more of the alkylene oxides such as ethylene oxide, propylene oxide, butylene oxide, cyclohexene oxide, and styrene epoxide. Similar alkylene oxide-alkanol amine reaction products can also be used such as the products made by reacting the aforedescribed primary, secondary or tertiary alkanolamines with ethylene, propylene or high epoxides in a 1.1 to 1.2 molar ratio. Reactant ratios and temperatures for carrying out such reactions are known to those skilled in the art.

Specific examples of hydroxyhydrocarbylated alkylenepolyamines include N-(2-hydroxyethyl) ethylenediamine, N,N-bis(2-hydroxyethyl)-ethylene-diamine, 1-(2-hydroxyethyl) piperazine, mono (hydroxypropyl)-substituted tetraethylenepentamine, N-(3-hydroxybutyl)-tetramethylene diamine, etc. Higher homologs obtained by condensation of the above-illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

Epoxides suitable for condensing with the short chain hydrocarbon include, for example, styrene oxide, ethylene oxide, propylene oxide, butylene oxide, stilbene oxide and $C_{2-50}$ epoxide.

It is contemplated that the individual substituted hydrocarbon additives of the present invention may form salts or other complexes and/or derivatives, when interacting with other components of the compositions in which they are used. Such forms of these additives are also part of the present invention and are include in the embodiments described herein. Some of the succinic acylating agents of the present invention and the processes for making them are disclosed in U.S. Pat. Nos. 5,739,356; 5,777,142; 5,786,490; 5,856,524; 6,020,500; and 6,114,547 which are hereby incorporated by reference. Other methods of making the hydrocarbyl substituted acylating agent can be found in U.S. Pat. Nos. 5,912,213; 5,851,966; and 5,885,944 which are hereby incorporated by reference. In some embodiments the succinic acylating agents of the present invention are prepared by the thermal process and/or chlorine free process only, as described in EP0355895 hereby incorporated by reference.

The fuel additive compositions of the present invention can comprise the mixture of the short and long chain substituted hydrocarbon additives described above and further comprise a solvent and/or one or more additional performance additives. Such compositions, also known as additive concentrates and/or concentrates, may be used to prepare fuel compositions by adding the fuel additive compositions to a refinery fuel, or commercial fuel, and preferably a refinery fuel.

The solvents suitable for use in the present invention include hydrocarbon solvents that provide for the compatibility of the substituted hydrocarbon additives, and/or homogeneity, and to facilitate their handling and transfer, and may include a fuel as described below. The solvent can be an aliphatic hydrocarbon, an aromatic hydrocarbon, an oxygen-containing composition, or a mixture thereof. In some embodiments the flash point of the solvent is generally about 25° C. or higher. In some embodiments the hydrocarbon solvent is an aromatic naphtha having a flash point above 62° C. or an aromatic naphtha having a flash point of 40° C. or a kerosene with a 16% aromatic content having a flash point above 62° C.

Aliphatic hydrocarbons include various naphtha and kerosene boiling point fractions that have a majority of aliphatic components. Aromatic hydrocarbons include benzene, toluene, xylenes and various naphtha and kerosene boiling point fractions that have a majority of aromatic components. Alcohols are usually aliphatic alcohols having about 2 to 10 carbon atoms and include ethanol, 1-propanol, isopropyl alcohol, 1-butanol, isobutyl alcohol, amyl alcohol, and 2-methyl-1-butanol.

The oxygen containing composition can include an alcohol, a ketone, an ester of a carboxylic acid, a glycol and/or a polyglycol, or a mixture thereof. The solvent in an embodiment of the invention will be substantially free of to free of sulfur having a sulfur content in several instances that is below 50 ppm, 25 ppm, below 18 ppm, below 10 ppm, below 8 ppm, below 4 ppm, or below 2 ppm. The solvent can be present in the fuel additive composition at 0 to 99 percent by weight, and in other instances at 3 to 80 percent by weight, or 10 to 70 percent by weight. The friction modifier of the present invention and the additional performance additives taken separately or in combination can be present in the fuel additive composition at 0.01 to 100 percent by weight, and in other instances can be present at 0.01 to 95 percent by weight, at 0.01 to 90 percent by weight, or at 0.1 to 80 percent by weight.

The substituted hydrocarbon additives may be present in the fuel additive composition on an active basis, i.e. free of diluent, from a total of about 0.01 to about 500 ppm, or from about 0.1 to about 400 ppm, preferably from about 0.5 to about 200 ppm, or 1 to about 100 ppm. In some embodiments the substituted hydrocarbon additives can be present in the fuel additive composition on an active basis from about 1 to about 50 ppm, or about 1 to about 25 ppm, or preferably about 1 to about 15 ppm. The ratio of the short chain substituted hydrocarbon additive to the ratio of the long chain substituted hydrocarbon additive can be on the order of 95:5 to 5:95, or 90:10 to 10:90, or even 75:25 to 25:75, and preferably 50:50.

In one embodiment, the fuel additive composition may comprise the substituted hydrocarbon additives of the present invention and be substantially free of any additional solvent. In these embodiments the fuel additive composition containing the substituted hydrocarbon additives of the present invention are neat, in that they do not contain any additional solvent added to improve the material handling characteristics of the composition, such as its viscosity.

In several embodiments of the invention the fuel additive composition and/or the substituted hydrocarbon additives themselves are substantially free of or free of at least one member selected from the group consisting of sulfur, phosphorus, sulfated ash, and combinations thereof, and in other embodiments the fuel composition contains less than 50 ppm, 20 ppm, less than 15 ppm, less than 10 ppm, or less than 1 ppm of any one or all of these members.

In an embodiment of the invention the fuel additive composition may be prepared by admixing or mixing the components of the composition at ambient to elevated temperatures usually up to 60° C. until the composition is homogeneous.

The additional performance additives which may be included in the fuel additive compositions of the present invention are described below.

The fuel additive compositions of the present invention can comprise the substituted hydrocarbon additives described above and a liquid fuel.

The present invention includes fuel additive compositions which may contain fuel. The fuel used in these compositions may or may not exhibit a propensity to pick-up ion containing contaminants, and may in fact be any of the fuels described in this application or combinations thereof. The fuel used in these compositions need not be the same fuel to which the fuel additive composition of the present invention may be added in the methods described herein. This fuel may or may not exhibit a propensity to pick-up ion containing contaminants. The identity of the fuel present in this composition is independent of the identity of the optional fuel component in the fuel additive composition. The ion containing contaminant pick-up propensity of the fuel and/or fuel additive composition may be a result of the properties of the fuel and/or the properties of one or more of the optional additives present in the fuel and/or fuel additive composition. By ion containing contaminants it is meant contaminants that contain ions, such as, for example, sodium, calcium, and the like.

The description that follows of the types of fuels suitable for use in the present invention refer to the fuel that may be present in the fuel additive compositions of the present invention as well as the fuel compositions to which the fuel additive compositions may be added.

Fuels suitable for use in the present invention are not limited. Generally, suitable fuels are normally liquid at ambient conditions e.g., room temperature (20 to 30° C.). The liquid fuel can be a hydrocarbon fuel, a non-hydrocarbon fuel, or a mixture thereof.

It is generally accepted in the industry that many types of commercial fuel, particularly market diesel fuels and/or biofuels, have the capacity to pick-up, or solubilize, some level of ion containing contaminants. There is also evidence that most if not all fuels, particularly market diesel fuels have some tendency to pick-up ion containing contaminants.

It has also been recognized that many fuel additives may increase the tendency of the fuel to pick-up ion containing contaminants in the fuel and fuel additive compositions in which they are used. Without being bound by theory, it is believed that the addition of the fuel additive compositions, as described in the method and compositions of the present invention result in, among other things, a binding of ion containing contaminants, rendering the ions unavailable for participation in deposit formation. Thus, in addition to the present invention reducing the propensity of the refinery fuel mixture, including the fuel additive compositions, to corrode metal surfaces, the present invention can reduce deposits caused by ion containing contaminants.

The hydrocarbon fuel can be a petroleum distillate, including a gasoline as defined by ASTM specification D4814, or a diesel fuel, as defined by ASTM specification D975, or a jet fuel as defined by ASTM D1655. In one embodiment the liquid fuel is a gasoline, and in another embodiment the liquid fuel is a non-leaded gasoline. In another embodiment the liquid fuel is a diesel fuel. The hydrocarbon fuel can be a hydrocarbon prepared by a gas to liquid process to include for example hydrocarbons prepared by a process such as the Fischer-Tropsch process. In some embodiments, the fuel used in the present invention is a diesel fuel, a biodiesel fuel, or combinations thereof.

The non-hydrocarbon fuel can be an oxygen containing composition, often referred to as an oxygenate, which includes an alcohol, an ether, a ketone, an ester of a carboxylic acid, a nitroalkane, or a mixture thereof. The non-hydrocarbon fuel can include for example methanol, ethanol, methyl t-butyl ether, methyl ethyl ketone, transesterified oils and/or fats from plants and animals such as rapeseed methyl ester and soybean methyl ester, and nitromethane.

Mixtures of hydrocarbon and non-hydrocarbon fuels can include, for example, gasoline and methanol and/or ethanol, diesel fuel and ethanol, and diesel fuel and a transesterified plant oil such as rapeseed methyl ester and other bio-derived fuels. In one embodiment the liquid fuel is an emulsion of water in a hydrocarbon fuel, a non-hydrocarbon fuel, or a mixture thereof. In several embodiments of this invention the liquid fuel can have a sulfur content on a weight basis that is 5000 ppm or less, 1000 ppm or less, 300 ppm or less, 200 ppm or less, 30 ppm or less, or 10 ppm or less.

In some embodiments, the fuels suitable for use in the fuel additive composition of the present invention include any refinery fuel or commercially available fuels, and in some embodiments any refinery diesel fuels and/or biofuels or commercially available diesel fuels and/or biofuels. In other embodiments, the fuels suitable for use in the fuel additive compositions of the present invention include any refinery fuels or commercially available fuels which are susceptible to ion containing contaminant pick-up, and in some embodiments any refinery diesel fuels and/or biofuels or commercially available diesel fuels and/or biofuels susceptible to ion containing contaminant pick-up.

In still other embodiments, the fuels suitable for use in the fuel additive compositions of the present invention are any fuels, or any diesel fuels and/or biofuels, which are susceptible to pick-up of ion containing contaminants to a level greater than 0.5 ppm when left in contact for an extended period of time with materials containing said ion containing contaminant. In some embodiments the exposure time involved is greater than 72 hours, greater than 48 hours, or greater than 24 hours.

The fuel additive compositions of the present invention can further comprise one or more additional performance additives. Additional performance additives can be added to a fuel additive composition or refinery fuel composition depending on several factors, which include the type of internal combustion engine in which the fuel composition will ultimately be used in, the type of refinery fuel being treated, the quality of the refinery fuel, and the conditions under which the refinery fuel is being stored or transported.

In some embodiments, the additional additive can include a fatty acid. Example fatty acids can include, but not be limited to, for example, natural or synthetic saturated or unsaturated acids which are linear or branched. The fatty acids can be used alone or as a mixture. Natural fatty acids include, for example, saturated or unsaturated linear fatty acids such as caproic acid, enanthic acid, caprylic acid, pelargonic acid, decanoic acid, lauric acid, myristic acid, palmitic acid, stearic acid, linolic acid, oleic acid, capric acid and undecanoic acid which are typically obtained by hydrolyzing vegetable oils and animal oils such as coconuts oils, palm oil, tallow, linseed oil and soybean oil. Examples of synthetic fatty acids, include, but are not limited to, linear or branched fatty acids prepared by oxidizing olefin polymers. It is also possible to use fatty acids derived from microorganisms such as, for example, gamma-linolenic acid. Further, as the lower alkyl ester of the fatty acid, alkyl esters having 1 to 8 carbon atoms such as methyl, ethyl or propyl ester of the fatty acid described above can be used. In some embodiments, the fatty acid can be further polymerized, that is, for example, dimerized or trimerized. In some embodiments, the fatty acid can be a mono acid. In some embodiments the fatty acid can be a dimer acid, a trimer acid, or a higher polymer acid. In some embodiments, the fatty acid can be a mixture of acids chosen from mono acids, dimer acids and trimer acids. In an embodiment the fatty acid can be a tall oil fatty acid (TOFA) and mixtures of dimerized, trimerized and/or higher polymerized derivatives thereof.

In some embodiments, the additional performance additives described herein may increase the tendency of a fuel composition to pick-up ion containing contaminants such as sodium and calcium. The use of the present fuel additive compositions in such situations can reduce and/or eliminate this impact of the additional additives.

The additional performance additives can include: an antioxidant such as a hindered phenol or derivative thereof and/or a diarylamine or derivative thereof; a corrosion inhibitor; and/or a detergent/dispersant additive, other than the mixture of the substituted hydrocarbon additives of the present invention, such as a polyetheramine or nitrogen containing detergent, including but not limited to PIB amine dispersants, quaternary salt dispersants, and succinimide dispersants.

The additional performance additives may also include: a cold flow improver such as an esterified copolymer of maleic anhydride and styrene and/or a copolymer of ethylene and vinyl acetate; a foam inhibitor and/or antifoam agent such as a silicone fluid; a demulsifier such as a polyalkoxylated alcohol; a lubricity agent such as a fatty carboxylic acid; a metal deactivator such as an aromatic triazole or derivative thereof, including but not limited to benzotriazole; and/or a valve seat recession additive such as an alkali metal sulfosuccinate salt.

Suitable antifoams also include organic silicones such as polydimethyl siloxane, polyethylsiloxane, polydiethylsiloxane, polyacrylates and polymethacrylates, trimethyl-triflouro-propylmethyl siloxane and the like.

The additional additives may also include a biocide; an antistatic agent, a deicer, a fluidizer such as a mineral oil and/or a poly(alpha-olefin) and/or a polyether, and a combustion improver such as an octane or cetane improver.

The additional performance additives, which may be present in the fuel additive compositions and fuel compositions of the present invention, also include di-ester, diamide, ester-amide, and ester-imide friction modifiers prepared by reacting a dicarboxylic acid (such as tartaric acid) and/or a tricarboxylic acid (such as citric acid), with an amine and/or alcohol, optionally in the presence of a known esterification catalyst. These friction modifiers, often derived from tartaric acid, citric acid, or derivatives thereof, may be derived from amines and/or alcohols that are branched so that the friction modifier itself has significant amounts of branched hydrocarbyl groups present within it structure. Examples of a suitable branched alcohols used to prepare these friction modifiers include 2-ethylhexanol, isotridecanol, Guerbet alcohols, or mixtures thereof.

The additional performance additives may comprise a high TBN nitrogen containing dispersant, such as a succinimide dispersant, that is the condensation product of a hydrocarbyl-substituted succinic anhydride with a poly(alkyleneamine). Succinimide dispersants are very well known in the art of lubricant formulation. Such molecules are commonly derived from reaction of an alkenyl acylating agent with a polyamine, and a wide variety of linkages between the two moieties is possible including a simple imide structure as well as a variety of amides and quaternary ammonium salts. Succinimide dispersants are more fully described in U.S. Pat. Nos. 4,234,435 and 3,172,892. Such materials may also contain ester linkages or ester functionality.

Another class of nitrogen-containing dispersant is the Mannich bases. These are materials which are formed by the condensation of a higher molecular weight, alkyl substituted phenol, an alkylene polyamine, and an aldehyde such as formaldehyde. Such materials are described in more detail in U.S. Pat. No. 3,634,515.

Other nitrogen-containing dispersants include polymeric dispersant additives, which are generally hydrocarbon-based polymers which contain nitrogen-containing polar functionality to impart dispersancy characteristics to the polymer.

An amine is typically employed in preparing the high TBN nitrogen-containing dispersant. One or more poly(alkyleneamine)s may be used, and these may comprise one or more poly(ethyleneamine)s having 3 to 5 ethylene units and 4 to 6 nitrogens. Such materials include triethylenetetramine (TETA), tetraethylenepentamine (TEPA), and pentaethylenehexamine (PEHA). Such materials are typically commercially available as mixtures of various isomers containing a range number of ethylene units and nitrogen atoms, as well as a variety of isomeric structures, including various cyclic structures. The poly(alkyleneamine) may likewise comprise relatively higher molecular weight amines known in the industry as ethylene amine still bottoms.

The additional performance additives may comprise a quaternary salt comprising the reaction product of: (i) at least one compound selected from the group consisting of: (a) the condensation product of a hydrocarbyl-substituted acylating agent and a compound having an oxygen or nitrogen atom capable of condensing with said acylating agent and said condensation product further having a tertiary amino group; (b) a polyalkene-substituted amine having at least one tertiary amino group; and (c) a Mannich reaction product having a tertiary amino group, said Mannich reaction product being prepared from the reaction of a hydrocarbyl-substituted phenol, an aldehyde, and an amine; and (ii) a quaternizing agent suitable for converting the tertiary amino group of compound (i) to a quaternary nitrogen. In some embodiments, the quaternizing agent is selected from the group consisting of: dialkyl sulfates, benzyl halides, hydrocarbyl substituted carbonates; hydrocarbyl epoxides in combination with an acid or mixtures thereof.

In one embodiment the quaternary salt comprises the reaction product of (i) at least one compound selected from the group consisting of: a polyalkene-substituted amine having at least one tertiary amino group and/or a Mannich reaction product having a tertiary amino group; and (ii) a quaternizing agent.

In another embodiment the quaternary salt comprises the reaction product of (i) the reaction product of a succinic anhydride and an amine; and (ii) a quaternizing agent. In such embodiments, the succinic anhydride may be derived from polyisobutylene and an anhydride, where the polyisobutylene has a number average molecular weight of about 800 to about 1600. In some embodiments the succinic anhydride is chlorine free.

In some embodiments, the hydrocarbyl substituted acylating agent of component (i)(a) described above is the reaction product of a long chain hydrocarbon, generally a polyolefin substituted with a monounsaturated carboxylic acid reactant such as (1) monounsaturated $C_4$ to $C_{10}$ dicarboxylic acid such as fumaric acid, itaconic acid, maleic acid.; (2) derivatives of (1) such as anhydrides or $C_1$ to $C_5$ alcohol derived mono- or di-esters of (1); (3) monounsaturated $C_3$ to $C_{10}$ monocarboxylic acid such as acrylic acid and methacrylic acid.; or (iv4 derivatives of (3) such as $C_1$ to $C_5$ alcohol derived esters of (3) with any compound containing an olefinic bond represented by the general formula:

$$(R^1)(R^1)C\!=\!C(R^1)(CH(R^1)(R^1)) \tag{I}$$

wherein each $R^1$ is independently hydrogen or a hydrocarbyl group.

Olefin polymers for reaction with the monounsaturated carboxylic acids can include polymers comprising a major molar amount of $C_2$ to $C_{20}$, e.g. $C_2$ to $C_5$ monoolefin. Such olefins include ethylene, propylene, butylene, isobutylene, pentene, octene-1, or styrene. The polymers can be homopolymers such as polyisobutylene, as well as copolymers of two or more of such olefins such as copolymers of: ethylene and propylene; butylene and isobutylene; propylene and isobutylene. Other copolymers include those in which a minor molar amount of the copolymer monomers e.g., 1 to 10 mole % is a $C_4$ to $C_{18}$ diolefin, e.g., a copolymer of isobutylene and butadiene; or a copolymer of ethylene, propylene and 1,4-hexadiene.

In one embodiment, at least one R of formula (I) is derived from polybutene, that is, polymers of $C_4$ olefins, including 1-butene, 2-butene and isobutylene. $C_4$ polymers can include polyisobutylene. In another embodiment, at least one R of formula (I) is derived from ethylene-alpha olefin polymers, including ethylene-propylene-diene polymers. Ethylene-alpha olefin copolymers and ethylene-lower olefin-diene terpolymers are described in numerous patent documents, including European patent publication EP0279863 and the following U.S. Pat. Nos. 3,598,738; 4,026,809; 4,032,700; 4,137,185; 4,156,061; 4,320,019; 4,357,250; 4,658,078; 4,668,834; 4,937,299; 5,324,800 each of which are incorporated herein by reference for relevant disclosures of these ethylene based polymers.

In another embodiment, the olefinic bonds of formula (I) are predominantly vinylidene groups, represented by the following formulas:

$$-\!(H)C\!=\!C(R^2)(R^2) \tag{II}$$

wherein $R^2$ is a hydrocarbyl group, and in some embodiments both $R^2$ groups are methyl groups, and $$-\!(H)(R^3)C(C(CH_3)\!=\!CH_2) \tag{III}$$

wherein $R^3$ is a hydrocarbyl group.

In one embodiment, the vinylidene content of formula (I) can comprise at least about 30 mole % vinylidene groups, at least about 50 mole % vinylidene groups, or at least about 70 mole % vinylidene groups. Such material and methods for preparing them are described in U.S. Pat. Nos. 5,071,919; 5,137,978; 5,137,980; 5,286,823; 5,408,018, 6,562,913, 6,683,138, 7,037,999 and U.S. Publication Nos. 20040176552A1, 20050137363 and 20060079652A1, which are expressly incorporated herein by reference, such products are commercially available by BASF, under the tradename GLISSOPAL® and by Texas Petrochemicals LP, under the tradename TPC 1105™ and TPC 595™.

Methods of making hydrocarbyl substituted acylating agents from the reaction of the monounsaturated carboxylic acid reactant and the compound of formula (I) are well know in the art and disclosed in the following patents: U.S. Pat. Nos. 3,361,673 and 3,401,118 to cause a thermal "ene" reaction to take place; U.S. Pat. Nos. 3,087,436; 3,172,892; 3,272,746, 3,215,707; 3,231,587; 3,912,764; 4,110,349; 4,234,435; 6,077,909; 6,165,235 and are hereby incorporated by reference.

In another embodiment, the hydrocarbyl substituted acylating agent can be made from the reaction of at least one carboxylic reactant represented by the following formulas:

$$(R^4C(O)(R^5)_nC(O))R^4 \tag{IV}$$

and

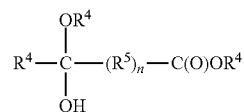

$$(V)$$

wherein each $R^4$ is independently H or a hydrocarbyl group, and each $R^5$ is a divalent hydrocarbylene group and n is 0 or 1 with any compound containing an olefin bond as represented by formula (I). Compounds and the processes for making these compounds are disclosed in U.S. Pat. Nos. 5,739,356; 5,777,142; 5,786,490; 5,856,524; 6,020,500; and 6,114,547 which are hereby incorporated by reference.

Other methods of making the hydrocarbyl substituted acylating agent can be found in the following reference, U.S. Pat. Nos. 5,912,213; 5,851,966; and 5,885,944 which are hereby incorporated by reference.

The compound having an oxygen or nitrogen atom capable of condensing with the acylating agent and further having a tertiary amino group can be represented by the following formulas:

$$(VI)$$

wherein X is a alkylene group containing about 1 to about 4 carbon atoms; and wherein each $R^6$ is independently a hydrocarbyl group, and $R^{6'}$ can be hydrogen or a hydrocarbyl group.

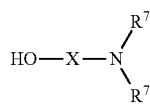

(VII)

wherein X is a alkylene group containing about 1 to about 4 carbon atoms; and wherein each $R^7$ is independently a hydrocarbyl group.

Examples of the nitrogen or oxygen contain compounds capable of condensing with the acylating agent and further having a tertiary amino group can include but are not limited to: ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene) triamine, the diaminobenzenes, the diaminopyridines or mixtures thereof. In addition, nitrogen or oxygen contain compounds which may be alkylated to contain a tertiary amino group may also used. Examples of the nitrogen or oxygen contain compounds capable of condensing with the acylating agent after being alkylated to having a tertiary amino group can include but are not limited to: dimethyl-aminopropylamine, N,N-dimethyl-aminopropylamine, N,N-diethyl-aminopropylamine, N,N-dimethyl-aminoethylamine or mixtures thereof. The nitrogen or oxygen containing compounds capable of condensing with the acylating agent and further having a tertiary amino group can further include aminoalkyl substituted heterocyclic compounds such as 1-(3-aminopropyl)imidazole and 4-(3-aminopropyl)morpholine, 1-(2-aminoethyl)piperidine, 3,3-diamino-N-methyldipropylamine, 3'3-aminobis(N,N-dimethylpropylamine). Another type of nitrogen or oxygen containing compounds capable of condensing with the acylating agent and having a tertiary amino group include alkanolamines including but not limited to triethanolamine, N,N-dimethylaminopropanol, N,N-diethylaminopropanol, N,N-diethylaminobutanol, N,N,N-tris(hydroxyethyl)amine, or mixtures thereof.

Examples of quaternary ammonium salt and methods for preparing the same are described in the following patents, which are hereby incorporated by reference, U.S. Pat. Nos. 4,253,980, 3,778,371, 4,171,959, 4,326,973, 4,338,206, and 5,254,138.

The additional performance additives can each be added directly to the fuel additive composition and/or the fuel compositions of the present invention, but they are generally mixed with the fuel additive composition, which is then mixed with fuel to result in a fuel composition.

In some embodiments, these additional performance additives described above may be the cause and/or a contributing factor to the propensity of a fuel to pick-up ion containing contaminants in the fuel compositions in which they are used. In other embodiments, the additives described above may have no impact on the ion containing contaminant pick-up properties of the fuel composition in which they are used. In either case, the additive compositions and methods of the present invention can counter the potential effect of these additives, for example, by binding the ion containing contaminants, whether that tendency is caused, exacerbated by, or not significantly changed by, the additional performance additives described above.

INDUSTRIAL APPLICATION

As previously indicated, the fuel additive compositions of this invention are useful as corrosion inhibitors in fuels, and may also function as detergents. The fuel additive compositions of the present invention can be present in fuel compositions at 1 to 10,000 ppm (where ppm is calculated on a weight:weight basis). In additional embodiments, the fuel additive composition is present in fuel compositions in ranges with lower limits of 1, 3, 5, 10, 50, 100, 150 and 200 ppm and upper limits of 10,000, 7,500, 5,000, and 2,500 where any upper limit may be combined with any lower limit to provide a range for the fuel additive composition present in the fuel compositions.

In one embodiment the invention is useful for a liquid refinery fuel and as it relates to the effect on the operation of an internal combustion engine ultimately run on the commercialized form of the refinery fuel, including either compression ignition engines or spark ignited engines. The internal combustion engine includes 2-stroke or 4-stroke engines fuelled with gasoline, diesel, a natural gas, a mixed gasoline/alcohol or any of the fuels described in the sections above. The compression ignition engines include both light duty and heavy duty diesel engines. The spark ignited engines include port and direct injection gasoline engines.

In other embodiments the invention is useful in fuel compositions in that the fuel additive compositions and methods described above bind ion containing contaminants in fuel compositions, thus preventing the negative impact associated with elevated levels of ions, such as sodium and calcium in the fuel.

The present invention includes the use of the substituted hydrocarbon and/or hydrocarbyl substituted acylating agents described herein as additives in fuel additive compositions, as well as the fuel additive compositions containing said additives and fuel compositions containing said fuel additive compositions. The substituted hydrocarbon additives of the present invention may be delivered to a refinery fuel composition and/or fuel additive compositions in any of the means known in the art and the timing of the additive is not limited. In a preferred embodiment, the substituted hydrocarbon additives are added to a fuel additive composition, which fuel additive composition is added to the refinery fuel. In other embodiments, the substituted hydrocarbon additives and/or the fuel additive compositions can be added to the refinery fuel composition before, during, or after refinement, but before blending of the refinery fuel composition with other additives. In still other embodiments, the fuel additive composition of the invention may be added to refinery fuel before, during, or after the addition of other performance additives which may be used in the refinery fuel compositions.

In another embodiment, the invention provides a method of preventing corrosion in refinery equipment which further includes reducing in an engine at least one of (1) injector deposits, and (2) fuel filter plugging. The method can include further blending a mixture of the refinery fuel and the fuel additive composition with additional fuel additives, and running the engine with the blended fuel composition.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. In addition the acylating agents and/or substituted hydrocarbon additives of the present invention may form salts or other complexes and/or derivatives, when interacting with other components of the compositions in which they are used. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples, which sets forth particularly advantageous embodiments. While the examples are provided to illustrate the present invention, they are not intended to limit it.

Sample 1—DDSA. Dodecyl succinic acid (DDSA).

Sample 2—Esterified DDSA. A dodecyl substituted succinic anhydride additive, which additive is mono-esterified with propylene glycol.

Sample 3—1000 PSA. A polyisobutylene succinic acid, wherein the polyisobutylene has an Mn of about 1000.

Sample 4—500 PSA. A polyisobutylene succinic acid, wherein the polyisobutylene has an Mn of about 500.

Sample 5—Unidyme™ 22 from Arizona Chemicals; a dimerized fatty acid product containing tall oil fatty acids (TOFA), dimer acids and trimer and higher polymer acids.

Example 1

Corrosion Test

The samples are tested for corrosion performance according to ASTM D665 for a test period of 4 hours in a mixture with an aliphatic petroleum distillate (dis) as a diesel reference fuel. Results are shown in table 1 below.

TABLE 1

| Fuel | Sample (ppm actives) | | | | | Results | |
| | 1 | 2 | 3 | 4 | 5 | % RUST PIN 1 | % RUST PIN 2 |
|---|---|---|---|---|---|---|---|
| dis | | | | | | 85 | 85 |
| dis | | 1.3 | | | | 65 | 75 |

TABLE 1-continued

| Fuel | Sample (ppm actives) | | | | | Results | |
| | 1 | 2 | 3 | 4 | 5 | % RUST PIN 1 | % RUST PIN 2 |
|---|---|---|---|---|---|---|---|
| dis | | 0.6 | 0.9 | | | 50 | 50 |
| dis | | | 1.7 | | | 60 | 65 |
| dis | | 6.3 | | | | 0 | 0 |
| dis | | 3.2 | 4.3 | | | 0 | 0 |
| dis | | | 8.5 | | | 0.5 | 0.5 |
| dis | 1.2 | | | | | 5 | 2 |
| dis | 0.6 | | 0.9 | | | <1 | <1 |
| dis | | | 1.7 | | | 60 | 65 |
| dis | 6.1 | | | | | 0 | 0 |
| dis | 3.1 | | 4.3 | | | 0 | 0 |
| dis | | | 8.5 | | | 0.5 | 0.5 |
| dis | | | 1.7 | | | 50 | 75 |
| dis | | | | 2.0 | | 12 | 10 |
| dis | | | 4.3 | | | 2 | 2 |
| dis | | | | 5.0 | | <1 | <1 |
| dis | | | 8.5 | | | 0.5 | 0.5 |
| dis | | | | 10.0 | | 0 | 0 |
| dis | | 2.9 | 4.8 | 2.3 | | 0 | 0 |
| dis | | 1.45 | 2.4 | 1.15 | | 0 | 0 |
| dis | | | | 5.0 | | 3 | 7 |
| dis | | | | 10.0 | | <1 | <1 |

The results of the corrosion test show that a combination of, (A) DDSA or Esterified DDSA and (B) polyisobutylene succinic acid provides acceptable anti-corrosion properties in diesel reference fuel. Further, the test shows that employing a polyisobutylene succinic acid with a lower Mn polyisobutylene provides improved corrosion performance, which would be expected to improve the corrosion performance in combination with DDSA or esterified DDSA in place of the 1000 Mn polyisobutylene.

Example 2

Engine Test

The samples are tested for creation of performance killing IDID in a commercial ultra-low sulfur diesel fuel (<15 ppm S) having inherent DDSA at a level of about 15 ppm. The test is described as follows. A John Deere 6068 Tier III Powertech 6.8 250 hp engine is broken in by running it for 100 hours on the diesel fuel at a torque of about 700 Nm. No filter plugging is observed during the breaking in. Testing on the samples then begins by filling the samples into the John Deere engine in a mixture with the ultra-low sulfur diesel fuel mixture along with about 10 ppm sodium contaminant provided from an overbased sodium alkylbenzene sulfonate. The torque at test start is consistently between 840 and 850 Nm. The engine is run at 95% load, or 95% of the power capacity the engine can handle maintaining the engine at 1400 rpm before shutting itself down. The engine is maintained at 95% load, as measured by computer, for eight hours of runtime testing and then is shut down and allowed to cold soak for four hours. The procedure is then repeated to achieve the appropriate number of hours of runtime testing. During operation, if the % load reaches the 98-99% range, the torque is adjusted downward until the % load comes back to 95%. The reverse process is employed when the load reaches the 92-93% range. Torque measurements are taken every six minutes along with exhaust temperature for each cylinder. Minimal power loss and temperature change are desired. The results of the test are summarized in Table 2.

TABLE 2

| Sample (ppm actives) | | | Contaminant (ppm) | Runtime | Torque loss | Avg. Exhaust Temp Loss 6 cylinders |
|---|---|---|---|---|---|---|
| 1 | 2 | 3 | Na (ppm) | (hrs) | (%) | delta (C.) |
| 15 | | | 0 | 100 | 0.0 | 2.0 |
| 15 | | | 10 | 32 | 9.4 | 44.2 |
| 35 | | | 10 | 32 | 11.3 | 36.9 |
| 15 | 20 | | 10 | 32 | 21.1 | 66.0 |
| 15 | | 20 | 10 | 64 | 4.8 | 23.9 |

The results show that adding sample 3 provides an improvement in torque loss and temperature loss, which translates to a reduction in IDID. Similar results would be expected with respect to the combination of the sample 2 with samples 3 and/or 4.

Example 3

Fuel Filter Test

Formulations with the samples are tested for fuel filter plugging in the aliphatic petroleum distillate reference diesel fuel. The test is described as follows.

A stock fuel solution is prepared from the diesel reference fuel and about 10 ppm sodium provided in an overbased sodium alkylbenzene sulfonate. The samples are blended with the stock solution. The blended solution is agitated once per day for seven days and then filtered through a 25 mm diameter, 1.5 μm pore size glass filter using an Emcee Model 1143 Micro-Filter Analyzer rig having a peristaltic pump and a pressure gauge. The rig is pre-set to shut down when a pressure of 15 psi is reached, or about 1250 mL of filtrate is achieved. The final pressure and volume of filtrate is recorded.

Table 3 below provides the results based upon the additives with all other things being equal (i.e., not taking into account the DDSA already present in the fuel).

TABLE 3

| Samples (ppm actives) | | | | | Final Pressure | |
|---|---|---|---|---|---|---|
| 1 | 2 | 3 | 4 | 5 | (psi) | Volume Filtrate (mL) |
| 40 | | | | | 0.6 | 1230 |
| 40 | 40 | | | | 0.5 | 1240 |
| 20 | | | | | 0.6 | 1250 |
| 20 | 20 | | | | 0.6 | 1250 |
| 40 | | | | | 15 | 50 |
| 40 | 40 | | | | 0.6 | 1240 |
| 20 | | | | | 15 | 505 |
| 20 | 20 | | | | 6.6 | 1240 |
| | 20 | | | | 0.6 | 1250 |
| | 40 | | | | 0.6 | 1230 |
| | | | 10 | | 0.5 | 1230 |
| | | | 20 | | 0.4 | 1240 |
| | | | 40 | | 0.5 | 1240 |
| | 11.2 | | 8.8 | | 15 | 170 |
| | 5.6 | 10 | | 4.4 | 1.3 | 1240 |
| | | 10 | 10 | | 0.6 | 1220 |
| | | | | 20 | 15 | 190 |

The test shows that adding samples 3 or 4 to sample 1 or sample 2 improves filter plugging performance.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quanti-ties in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A composition comprising a mixture of:
   (a) at least one substituted hydrocarbon additive comprising a condensation product of a $C_6$ to $C_{30}$ hydrocarbyl substituted succinic anhydride with an alcohol or an epoxide; and
   (b) at least one substituted hydrocarbon additive comprising a long chain succinic acid, wherein the long chain hydrocarbon comprises a polyolefin of from about 280 to about 5000 Mw.

2. The composition of claim 1 wherein the at least one substituted hydrocarbon additive of (a) comprises a condensation product of a $C_6$ to $C_{10}$ hydrocarbyl substituted succinic anhydride with an alcohol or an epoxide.

3. The composition of claim 1 wherein the alcohol of (a) is at least one of a mono-alcohol, diol, polyol or alkanolamine.

4. The composition of claim 3 wherein the alcohol of (a) comprises propane diol, butane diol.

5. The composition of claim 1 wherein the epoxide of (a) comprises ethylene oxide, propylene oxide, or butylene oxide.

6. The composition of claim 1 wherein the composition further comprises (c) a fatty acid and/or dimerized, trimerized and/or polymerized derivatives thereof.

7. The composition of claim 1 additionally comprising (d) a fuel, wherein the fuel comprises a petroleum distillate, biodiesel or combinations thereof.

8. The composition of claim 1 wherein the hydrocarbyl group of the substituted hydrocarbon of (a) comprises an alkyl having on average 12 carbon atoms.

9. The composition of claim 1 wherein the hydrocarbyl group of the substituted hydrocarbon of (b) comprises polyisobutylene.

10. The composition of claim 1, further comprising (d) a hydrocarbon solvent that is liquid at 20° C.

11. The composition of claim 1, further comprising (e) a fuel additive component, containing one or more dispersants that are different from the substituted hydrocarbon additives of (a) and (b).

12. A method of preventing corrosion in equipment comprising adding a composition according to claim 1 to a fuel to create a fuel mixture of the fuel and composition, and operating the equipment.

13. The method of claim 12, wherein said fuel comprises a petroleum distillate, biodiesel or combinations thereof.

14. The method of claim 13 wherein said petroleum distillate is diesel, gasoline, or jet fuel.

15. The method of claim 12 wherein said equipment is an engine and wherein the method further comprises reducing in said engine at least one of (1) injector deposits and (2) fuel filter plugging.

16. A method comprising, using a fuel additive in a fuel mixture of the fuel additive and fuel to reduce corrosion in equipment and injector deposit formation and fuel filter plugging in an engine operating on a fuel composition comprising the fuel mixture, wherein the fuel additive comprises the composition of claim 1.

* * * * *